United States Patent
Kenneally et al.

(10) Patent No.: US 12,246,446 B2
(45) Date of Patent: *Mar. 11, 2025

(54) LEGGED ROBOT

(71) Applicant: Ghost Robotics Corporation, Philadelphia, PA (US)

(72) Inventors: Gavin Kenneally, Philadelphia, PA (US); Jiren Parikh, Philadelphia, PA (US)

(73) Assignee: Ghost Robotics Corp., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,409

(22) Filed: Mar. 4, 2024

(65) Prior Publication Data

US 2024/0208045 A1  Jun. 27, 2024

Related U.S. Application Data

(63) Continuation of application No. 17/291,240, filed as application No. PCT/US2019/053256 on Sep. 26, 2019, now Pat. No. 11,951,621.

(Continued)

(51) Int. Cl.
*B25J 9/12* (2006.01)
*B25J 13/08* (2006.01)
(Continued)

(52) U.S. Cl.
CPC ............... *B25J 9/12* (2013.01); *B25J 13/088* (2013.01); *B25J 19/0025* (2013.01); *B62D 57/02* (2013.01)

(58) Field of Classification Search
CPC ........ B25J 9/12; B25J 13/088; B25J 19/0025; B25J 9/102; B62D 57/02; B62D 57/032
See application file for complete search history.

(56) References Cited

U.S. PATENT DOCUMENTS

2002/0089297 A1*  7/2002  Filo .................. A63H 11/20
                                                              318/568.12
2002/0179342 A1* 12/2002  Quinn .................. B62D 57/022
                                                                      180/8.1

(Continued)

FOREIGN PATENT DOCUMENTS

CN         104890759 A      9/2015
CN         105027828 B     11/2015
(Continued)

OTHER PUBLICATIONS

Office Action received in corresponding EP application No. 19888566.7, dated Nov. 11, 2023.
(Continued)

*Primary Examiner* — Adam R Mott
*Assistant Examiner* — Sagar Kc
(74) *Attorney, Agent, or Firm* — White and Williams LLP (57) ABSTRACT

A legged robot having a frame with a plurality of links in mechanical communication with plurality of brackets, the frame forming a front, back, top, bottom, and sides, legs in mechanical communication with one or more of the plurality of brackets, each leg having a knee motor, an abduction motor, and a hip motor, a computer module in mechanical communication with one or more of the plurality of brackets and in electrical communication with the legs, and a power module in mechanical communication with one or more of the plurality of brackets and in electrical communication with the legs and the computer module.

9 Claims, 10 Drawing Sheets

Related U.S. Application Data (60) Provisional application No. 62/736,739, filed on Sep. 26, 2018, provisional application No. 62/736,743, filed on Sep. 26, 2018.

(51) Int. Cl.
  *B25J 19/00* (2006.01)
  *B62D 57/02* (2006.01)

(56) References Cited

U.S. PATENT DOCUMENTS

| | | |
|---|---|---|
| 2010/0164243 A1 | 7/2010 | Albin |
| 2016/0089793 A1 | 3/2016 | Truebenbach et al. |
| 2018/0169868 A1* | 6/2018 | Jackowski ............. B25J 13/088 |
| 2020/0030964 A1* | 1/2020 | Nakayama ................ B25J 9/02 |
| 2020/0215700 A1 | 7/2020 | Bao et al. |
| 2020/0282554 A1* | 9/2020 | Wang ................... B25J 19/0054 |
| 2020/0361098 A1* | 11/2020 | Milhau .................. G01R 27/02 |
| 2021/0101292 A1 | 4/2021 | Kuppuswamy et al. |
| 2022/0001531 A1 | 1/2022 | Kenneally et al. |

FOREIGN PATENT DOCUMENTS

| | | |
|---|---|---|
| CN | 207345974 U * | 5/2018 |
| EP | 2480173 B1 | 8/2012 |
| WO | 2018/161936 A1 | 9/2018 |
| WO | 2022041464 A1 | 3/2022 |

OTHER PUBLICATIONS

Office Action received in corresponding JP application No. 2021-538395, dated Jan. 28, 2024.
Examination Report No. 1 for Standard Patent Application received in related Australian National Phase Application No. 2019388551, dated Feb. 29, 2024.
International Search Report and Written Opinion in corresponding PCT Application No. PCT/2024/015367 mailed May 6, 2024.

* cited by examiner

LEGGED ROBOT

CROSS-REFERENCE TO RELATED APPLICATIONS

This application is a continuation of U.S. patent application Ser. No. 17/291,240, filed May 5, 2021, now U.S. Pat. No. 1,951,621, which is a National Stage Entry of PCT Application No. PCT/US19/53256, filed Sep. 26, 2019, which claims the benefit of earlier filed U.S. Provisional Application No. 62/736,739, filed on Sep. 26, 2018, as well as U.S. Provisional Application No. 62/736,743, filed Sep. 26, 2018, all of which are incorporated by reference herein in their entirety.

BACKGROUND

Due to their electromechanical complexity, legged robots can be difficult to maintain and repair without a highly trained technician present. This may limit functionality and use of such robots, particularly when technicians are not immediately available or in high-stress environments such as military or policing situations where a complex design will increase the time to repair or make onsite repair difficult or impossible. The issue may be further complicated when a robot is desired for operation in harsh environments where componentry may rapidly deteriorate or the robotic device has a high probability of damage during operation. It may be advantageous for a robotic system to have a modular design, such that core components may be interchanged by users with less repair experience or knowledge of the system design. Because robotic systems may be desired for use in environments hostile to human presence, it may also be advantageous for component interchange to be possible without requiring humans to be in physical proximity to the robotic system.

Users of robots, and specifically legged robots, may want to interchange variants of key components for different use cases and environments without purchasing a new robot. For example, an exoskeleton frame may be sized larger to accommodate a larger sensor, battery or robotic actuator and leg, or robotic actuator. Similarly, a leg may be sized in length for a specific application such as subterranean tunnel exploration or for climbing stairs, while different sizes and types of motors may be used for specific tasks and power requirements, such as to move over certain substrates such as sand or mud, swim in water or carry heavier payloads. Such interchangeability increases the usability of the robots for a broader range of use cases and reduce the cost for a user.

Furthermore, it may be desirable to have sealed sub-assemblies individually injected with inert gas to create positive pressure to block external flammable gases, dust and particulate from entering into the sub-assemblies and causing potential fire or explosive discharge, and allowing them to be used in environments such as coal mines, gas manufacturing plants and refineries where equipment must be intrinsically safe for operation.

Finally, it may be desirable to have a sub-assembly design where all electronics are separated and sealed with the mechanicals can be operated without an external cover (skin), reducing weight and supporting faster interchange of specific subassemblies.

SUMMARY OF DISCLOSURE

Some or all of the above needs and/or problems may be addressed by certain embodiments of the disclosure. In one aspect, the present invention may have a legged robot having a frame with a plurality of links in mechanical communication with plurality of brackets, the frame forming a front, back, top, bottom, and sides, legs in mechanical communication with one or more of the plurality of brackets, each leg having a knee motor, an abduction motor, and a hip motor, a computer module in mechanical communication with one or more of the plurality of brackets and in electrical communication with the legs, and a power module in mechanical communication with one or more of the plurality of brackets and in electrical communication with the legs and the computer module.

BRIEF DESCRIPTION OF THE DRAWINGS

The detailed description is set forth with reference to the accompanying drawings, which are not necessarily drawn to scale. The use of the same reference numbers in different figures indicate similar or identical terms.

DETAILED DESCRIPTION

In order that the present invention may be fully understood and readily put into practical effect, there shall now be described by way of non-limiting examples of preferred embodiments of the present invention, the description being with reference to the accompanying illustrative figures.

Figure 1:
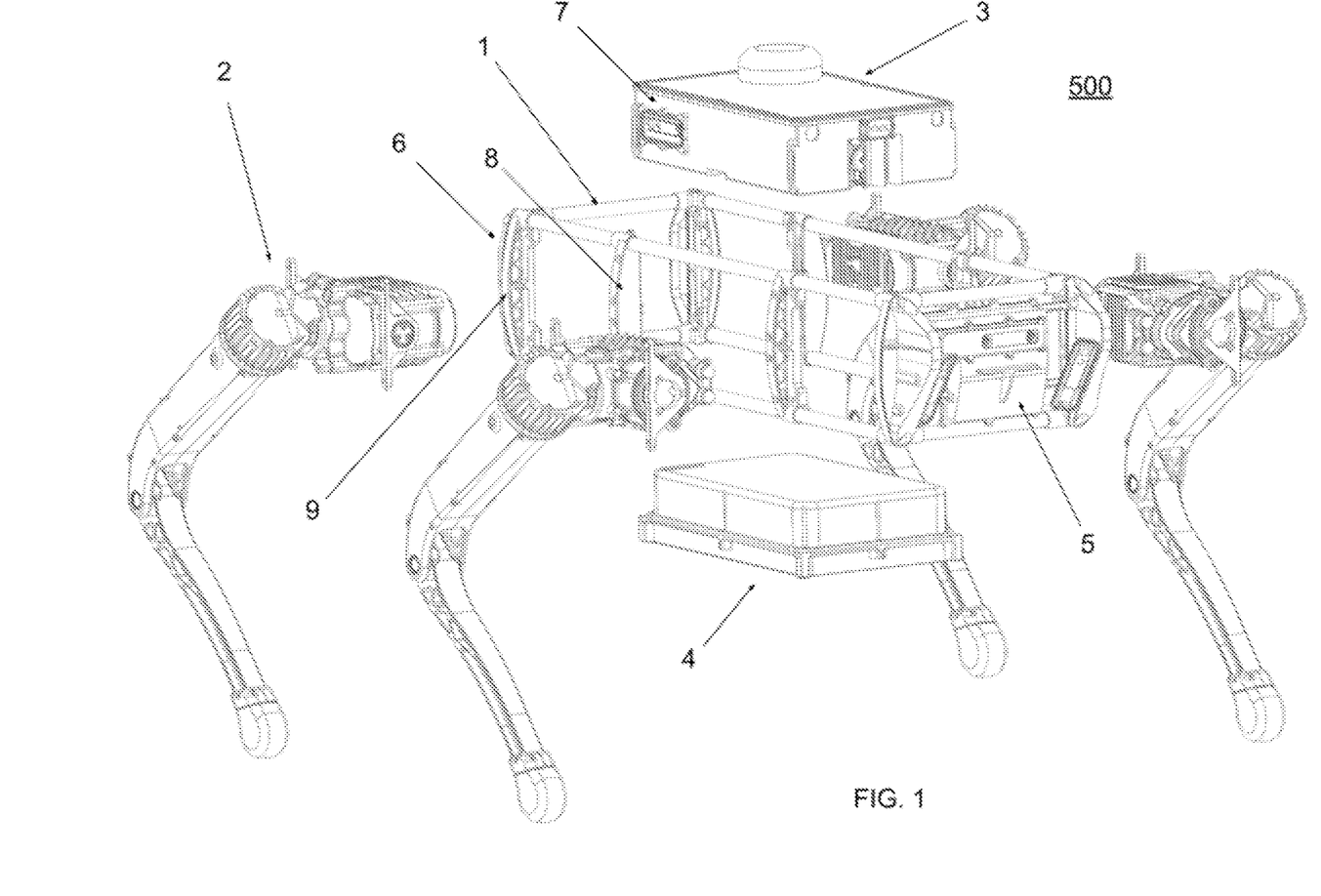
FIG. 1 is an exploded perspective view of the legged robot according to an aspect of the present disclosure.

FIG. 1 shows an exploded perspective view of Robotic System 500 according to an aspect of the present disclosure. Robotic System 500 may have Frame 1 capable of securing and interfacing with Leg Subassembly 2, Computing Box 3, Energy Box 4, and other components. Frame 1 may be formed of material suitable for an intended environment, including but not limited to, metals, ceramics, plastics, composites, and wood. In general, the materials typically suitable for many applications may be aluminum, steel, or composites.

Robotic System 500 may have Sensor Panel 5, Sensor Strip 6, and Sensor Enclosure 7 that may support various components and connectors, including, but not limited to, sensors, screens, buttons, interface ports and buses, switches, electrical components capable of transmitting or receiving power to or from an outside source including in the presence of an electromagnetic field.

Non-limiting examples of sensor components may include light sensors such as cameras, photoresistors, phototubes, phototransistors, or photovoltaic cells; sound sensors such as microphones; temperature sensors such as a LM34, LM35, TMP35, or TMP 36 sensors; contact sensors such as push button switches, tactile bumper switches, or capacitive contact sensors such as touch screens; proximity sensors such as infrared (IR) transceivers, ultrasonic sensors, or photoresistors; distance sensors such as laser range sensors including LIDAR, and stereo cameras; pressure sensors such as a barometer; tilt sensors such as an analog mercury-suspension glass bulb sensor; positioning sensors such as global position system (GPS) sensors and digital magnetic compasses; acceleration sensors such as accelerometers; gyroscopes; inertial measurement units; electrical sensors such as voltmeters; radiofrequency sensors; radar; chemical sensors; or any other device capable of receiving or transmitting information or transforming environmental information into an analytically useful signal.

Sensor Panel 5 may be a panel that holds electrical, sensory and user interface components that may be attached to the front, back, or side of Frame 1. Sensor Strip 6 may be an enclosure or attachment point of electrical and sensory components that may attach to Side Brackets 8 or Corner Brackets 9 through various connective techniques including but not limited to, welding, clamping, adhesive, threaded fasteners, interference fit, magnetic, hook and loop, or similar joining technologies. Sensor Enclosure 7 may be an enclosure of electrical and sensory components that may attach to Computing Box 3, Energy Box 4, Frame 1, or panels attached to Frame 1. Attachment of Sensor Enclosure 7 may be done through various connective techniques including but not limited to, adhesive, threaded fasteners, interference fit, magnetic, hook and loop, or similar connection mechanisms, or it may be embedded directly into another component in or on Robotic System 500. In one non-limiting aspect as shown in FIG. 1, Sensor Enclosure 7 may be affixed to Computing Box 3, but it is understood that Sensor Enclosure 7 may be moved to other components within Robotic System 500.

Still referencing FIG. 1, Frame 1 may contain Side Brackets 8 and Corner Brackets 9 that may provide structural support to Frame 1 and the components secured thereon. Side Brackets 8 and Corner Brackets 9 may be made out of similar material to Frame 1 depending on the intended use of Robotic System 500. In general, Side Brackets 8 and Corner Brackets 9 may be designed with the specific function of Robotic System 500 in mind. For example, if Robotic System 500 is intended to carry a large payload, then Side Brackets 8 and Corner Brackets 9 may be made out of a sturdier material than other components of Frame 1 to better support the payload against the forces of gravity. In general, common material suitable for many applications includes steel, aluminum and composites.

Still referencing FIG. 1, Frame 1 may be coupled to one or more Leg Subassemblies 2. Each Leg Subassembly 2 may enable robotic movement such that Robotic System 500 is capable of moving translationally, or rotationally, within an environment in a controlled manner.

Still referencing FIG. 1, Robotic System 500 may include a Computing Box 3 which may house electrical and computing components assisting the operation and control of Robotic System 500. Robotic System 500 may also include an Energy Box 4 which may house components capable of storing and supplying electrical power to Robotic System 500. Although FIG. 1 shows Computing Box 3 and Energy Box 4 located substantially at the center of Frame 1, other configurations are possible depending on intended use of Robotic System 500. For example, Energy Box 4 may be switched to the top, and Computing Box 3 switched to the bottom; both Energy Box 4 and Computing Box 3 may be shifted forward or aft; or they may be rotated in various configurations within, on or about Frame 1.

Figure 2:
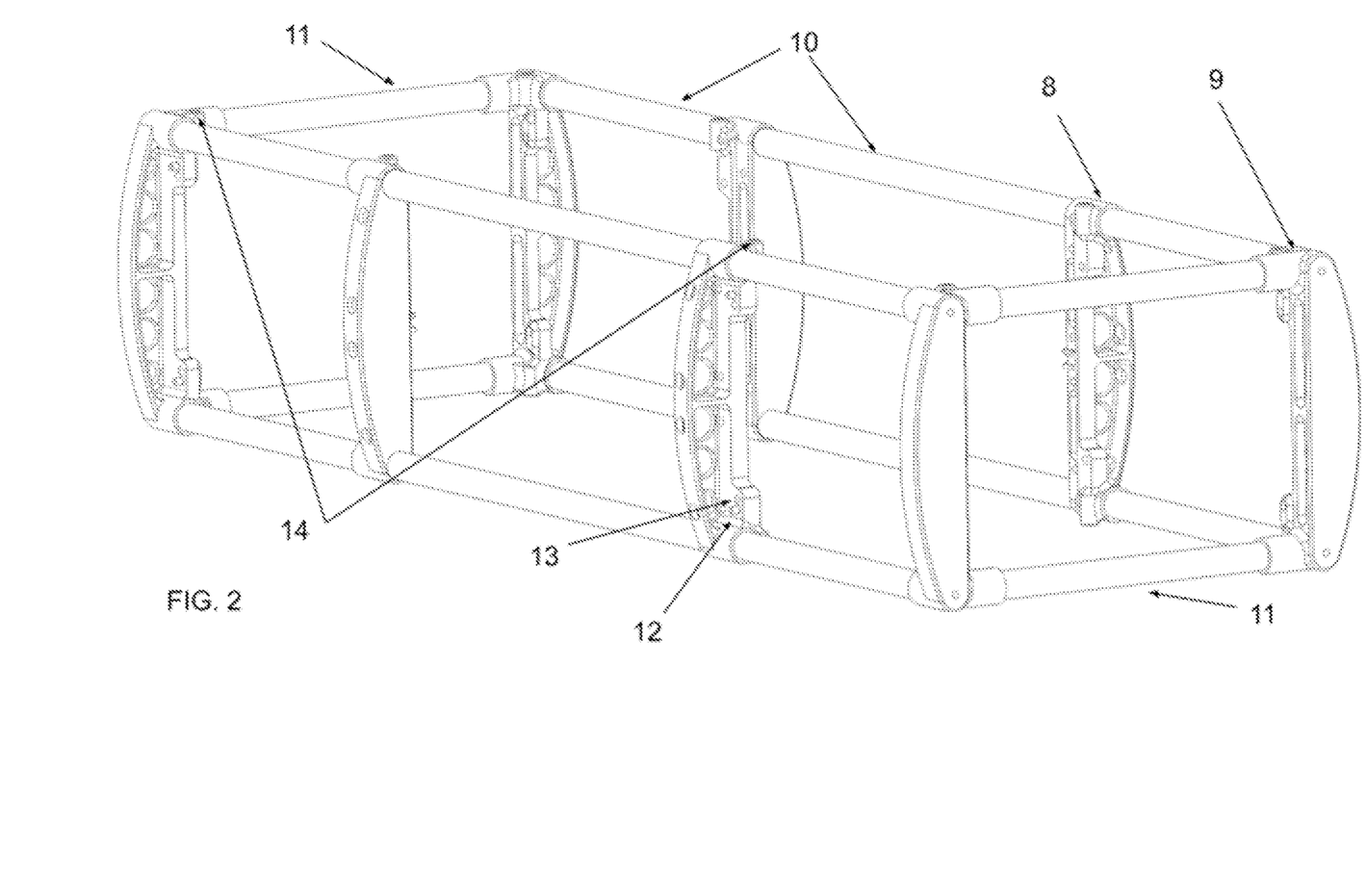
FIG. 2 is a perspective view of the Frame according to an aspect of the present disclosure.

FIG. 2 is a view of Frame 1 according to an aspect of the present disclosure. Frame 1 may be formed of links and brackets, such as Side Links 10 that may be fastened by or to Side Brackets 8, and End Links 11 that may be fastened by or to Side Links 10 via Corner Brackets 9. In one non-limiting aspect, additional End Links 11 (not shown) may be fastened perpendicularly to Side Links 10 via Side Brackets 8, and this may add stability to Frame 1 at increased weight and cost. Fastening may be done by welding, adhesive, clamping, interference fits, or other joining technologies or mechanisms. Side and End Links 10 & 11 may be formed of any material suitable for the operating environment, including but not limited to, metals, ceramics, plastics, composites, and wood. In general, common material suitable for many applications includes steel, aluminum and composites. In one non-limiting aspect, Side and End Links 10 & 11 may be formed as hollow tubes.

Side and End Links 10 & 11 may be able to route electrical power and electronic signals from one component of Robotic System 500 to other components. This may be done in various ways, including but not limited to, integrated circuitry within Side and End Links 10 & 11, or wire or fiber optics housed within Side and End Links 10 & 11. In some non-limiting examples, power and other signals may be routed via external cables; cables embedded within Side Links 10 and/or End Links 11; and/or embedded connectors that engage when a sensor or sensor head is coupled to Frame 1.

Side Brackets 8 may provide structural support to Frame 1 and may provide connection points to interior and exterior components, such as Energy Box 4 and Computing Box 3. In some non-limiting examples, Side Brackets 8 may couple to Energy Box 4 and Computing Box 3 with threaded fasteners, clips, adhesives, hook and loops, electromagnetic, interference fit, or other similar connection mechanisms. In some non-limiting examples, Side Brackets 8 may couple to Sensor Panel 5, Sensor Strip 6, and Sensor Enclosure 7 (as shown in FIG. 1) with threaded fasteners, clips, adhesives, hook and loops, electromagnetic, interference fit, or other similar connection mechanisms.

Corner Brackets 9 may provide structural support to Frame 1 and may provide connection points to interior and exterior components, such as Sensor Panel 5, Sensor Strip 6, and Sensor Enclosure 7 (as shown in FIG. 1). In some non-limiting examples, Corner Brackets 9 may couple to Sensor Panel 5, Sensor Strip 6, and Sensor Enclosure 7 with threaded fasteners, clips, adhesives, hook and loops, electromagnetic, interference fit, or other similar connection mechanisms.

Although not pictured in FIG. 1 or 2, it is understood that interior or exterior components including Computing Box 3, Energy Box 4, Sensor Panel 5, Sensor Strip 6, and Sensor Enclosure 7 may be affixed either to Side Brackets 8, Corner Brackets 9 or Frame 1 as called for by the design considering the intended purpose of Robotic System 500.

Side Brackets 8 may also provide a connection to Leg Subassembly 2 through Alignment Guide 12 and Alignment Fastener 13. Alignment Guide 12 may be a geometric feature including, but not limited to, a hole, prong, or peg capable of providing alignment and a load bearing connection when attaching to Leg Subassembly 2 through the use of pins, splines, edge contacts, or similar mechanisms. Alignment Fastener 13 may be a retention mechanism including, but not limited to, a hole, prong, or peg to align Leg Subassembly 2 with Frame 1 through the use of connectors including, but not limited to, threaded fasteners, clips, adhesives, hook and loops, interference fits, electromagnetic, or other fasteners. FIG. 2 shows one non-limiting aspect wherein Alignment Guide 12 may be a prong or peg, and Alignment Fastener 13 may be a hole. Although not pictured in FIG. 2, in one non-limiting aspect, Alignment Guide 12 and Alignment Fastener 13 may be included on Corner Brackets 9 thereby enabling connection to Leg Subassembly 2 via Corner Brackets 9. Such a configuration may be advantageous in certain operational circumstances.

Still referencing FIG. 2, Frame 1 may also include Payload Fastener 14, which may be a retention mechanism to hold external devices or payloads onto Frame 1 through the use of threaded fasteners, clips, adhesives, hook and loops, electromagnetic, interference fit, or other similar connectors. Although FIG. 2 shows Payload Fastener 14 as part of Side Brackets 8 and Corner Brackets 9, Payload Fastener 14 may be located anywhere on Frame 1 and in any configuration desired by the user, such that the payload is fastened and secured according to the unique needs of the user.

Referencing now FIGS. 1 and 2, Energy Box 4 may connect to Side Brackets 8 in a way that such connection is easily and intentionally engaged or disengaged. In FIG. 1, Energy Box 4 may slide into ports located on Side Brackets 8 through the underside of Frame 1. Similarly, Computing Box 3 may have a similar connection that is easily intentionally engaged or disengaged allowing Computing Box 3 to slide in through the top of Frame 1.

Referencing again FIG. 2, panels may be mounted between each Side Brackets 8 and Corner Brackets 9 such that the interior of Frame 1 is an isolated or quasi-isolated environment. These panels may be made out of any material deemed suitable for use by the user depending on the intended purpose. For example, panels may be serve a decorative, support or protective purpose. FIG. 1 shows an example panel according to one non-limiting aspect wherein Sensor Panel 5 is mounted to the front of Frame 1, via Corner Brackets 9. Panels may also be secured to Side and End Links 10 & 11 for additional support through connection methods such as snap fits, interference fits, electromagnetic, hook and loops, or similar methods.

Figure 3:
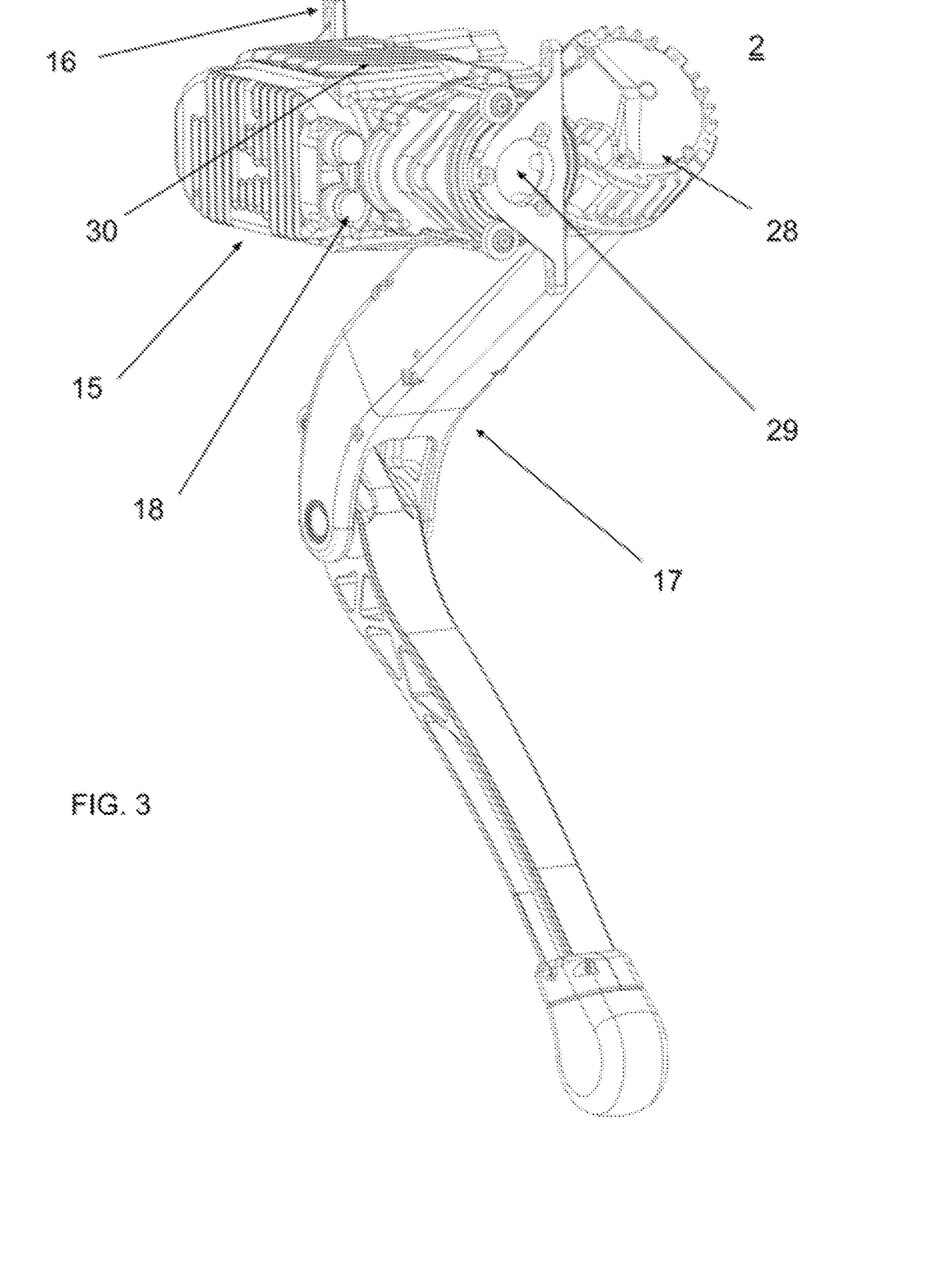
FIG. 3 is a perspective view of Leg Subassembly according to an aspect of the present disclosure.

FIG. 3 is a view of the Leg Subassembly 2 according to an aspect of the present disclosure. Leg Subassembly 2 may contain Pod 15 which may contain motor control electronics as well as a subset of motors, mechanical reductions, transmissions, and encoders in a secure and isolated environment. Leg Subassembly 2 may also include Interface Bracket 16 which may enable coupling to Frame 1 through one or more of Alignment Guide 12 and Alignment Fastener 13. Pod 15 may have an electrical connection to Interface Bracket 16 such that electrical power and/or electronic signals may be received and directed to the components within Pod 15 thus supplying power and control to the components of Pod 15. Pod 15 may also contain Pod Connectors 18 that may provide an additional or alternative interface for providing power and electronic signals to the internal components of Pod 15.

Leg Subassembly 2 may also have Leg Components 17 including an upper leg hingably coupled to a lower leg that may be made out of materials such as metals, composites, plastics, ceramics, or others if deemed appropriate for the intended use, and may include additional internal electromotive components such as motors, reductions, transmissions, and encoders. Depending on electrical input received by the components of Pod 15, Leg Subassembly 2 may be capable of performing translative or rotational movement with respect to Frame 1 such that Robotic System 500 may be capable of independent movement through its environment. The upper leg may be uncoupled from the lower leg thereby enabling interchange of the lower leg component. This may be done to repair a damaged lower leg, or may be done to replace the lower leg with a configuration more suitable to the intended environment, for example, with a component having different geometry. Similarly, a distal end of Leg Components 17 may include a removable tread suitable for contact with the environment surface, or the ground. The shape of the removable tread may be optimized for the environment and may include a robotic foot, fins, wheels, claws, or others.

Figure 4:
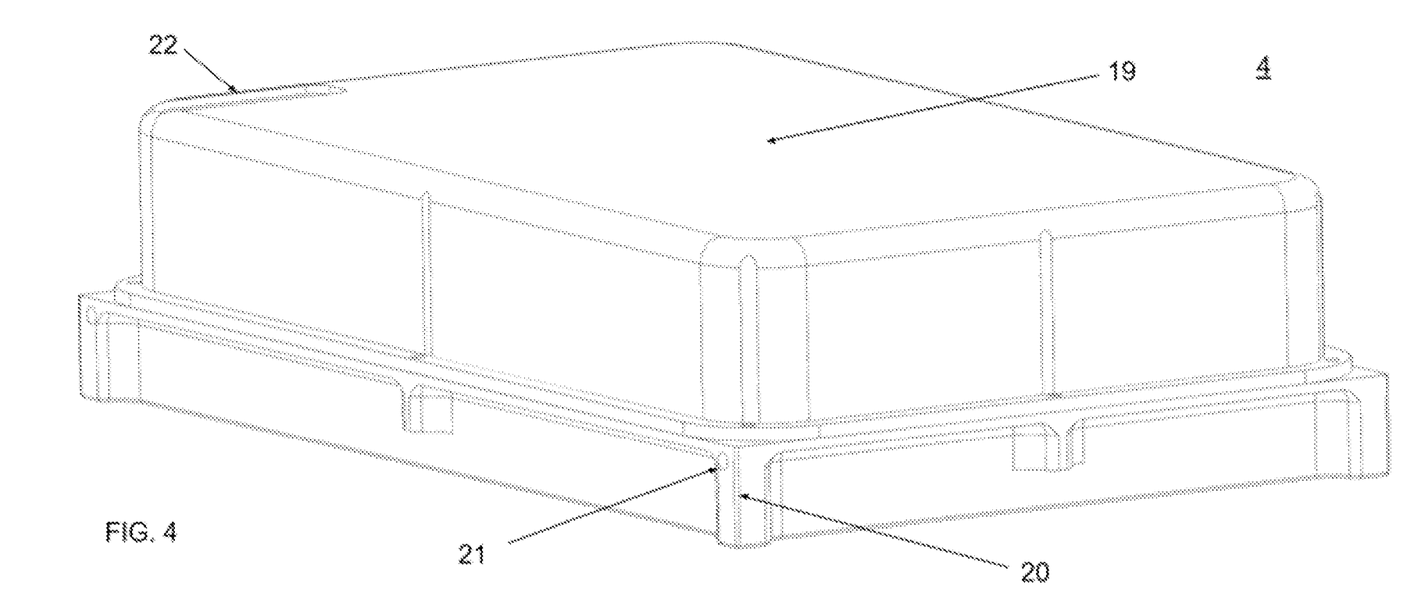
FIG. 4 is a perspective view of Energy Box according to an aspect of the present disclosure.

FIG. 4 is a view of Energy Box 4 according to an aspect of the present disclosure. Energy Box 4 may have a Protective Housing 19 wherein electrical and computing components are stored including, but not limited to, chemical batteries, capacitors, fuel cells, internal engines, as well as all necessary computing and control systems. Protective Housing 19 may be constructed out of materials specifically designed for the environment in which Robotic System 500 is to be used. For example, if such an environment was near or under water, then Protective Housing 19 may be made constructed to be watertight out of a material that strongly resists corrosion and has proper buoyancy characteristics.

Energy Box 4 may include Energy Box Guide 20 which may guide a user to install Energy Box 4 within Frame 1. In one non-limiting aspect, Energy Box Guide 20 may be a unique geometric shape or frame that permits installation when Energy Box 4 is oriented in a specific and correct way, relative to Frame 1. Energy Box 4 may include a disengageable Energy Box Fastener 21 that may provide additional structural support to Energy Box 4. Energy Box Fastener 21 may be a clamp, adhesive, threaded fasteners, interference fit, magnetic, hook and loop, push pin or "push and click" connectors, or similar disengageable support technologies. In one non-limiting aspect, Energy Box Fastener 21 may be a hole that mates with Bracket Fastener 26 located on Side Bracket 8.

Energy Box 4 may also have Electrical Connector 22 that permits the transmission of electrical power and electronic signals to and from the components within Energy Box 4. Electrical Connector 22 may include any method or mechanism for transmitting electronic signals and electrical power to or from the outside of Energy Box 4 to or from the components therein, including but not limited to, wire connections, integrated circuits, wireless power transmission, or kinetically induced power generation. In one non-limiting example, Energy Connector 22 may be an electrically conductive material inlaid within Protective Housing 19, capable of transmitting electronic signals and electrical power from the outside of Energy Box 4 to the components therein upon contact. In one non-limiting example, Energy Connector 22 may be made out of highly electrically conductive metal, such as silver or copper, or other electrically useful materials.

Figure 5:
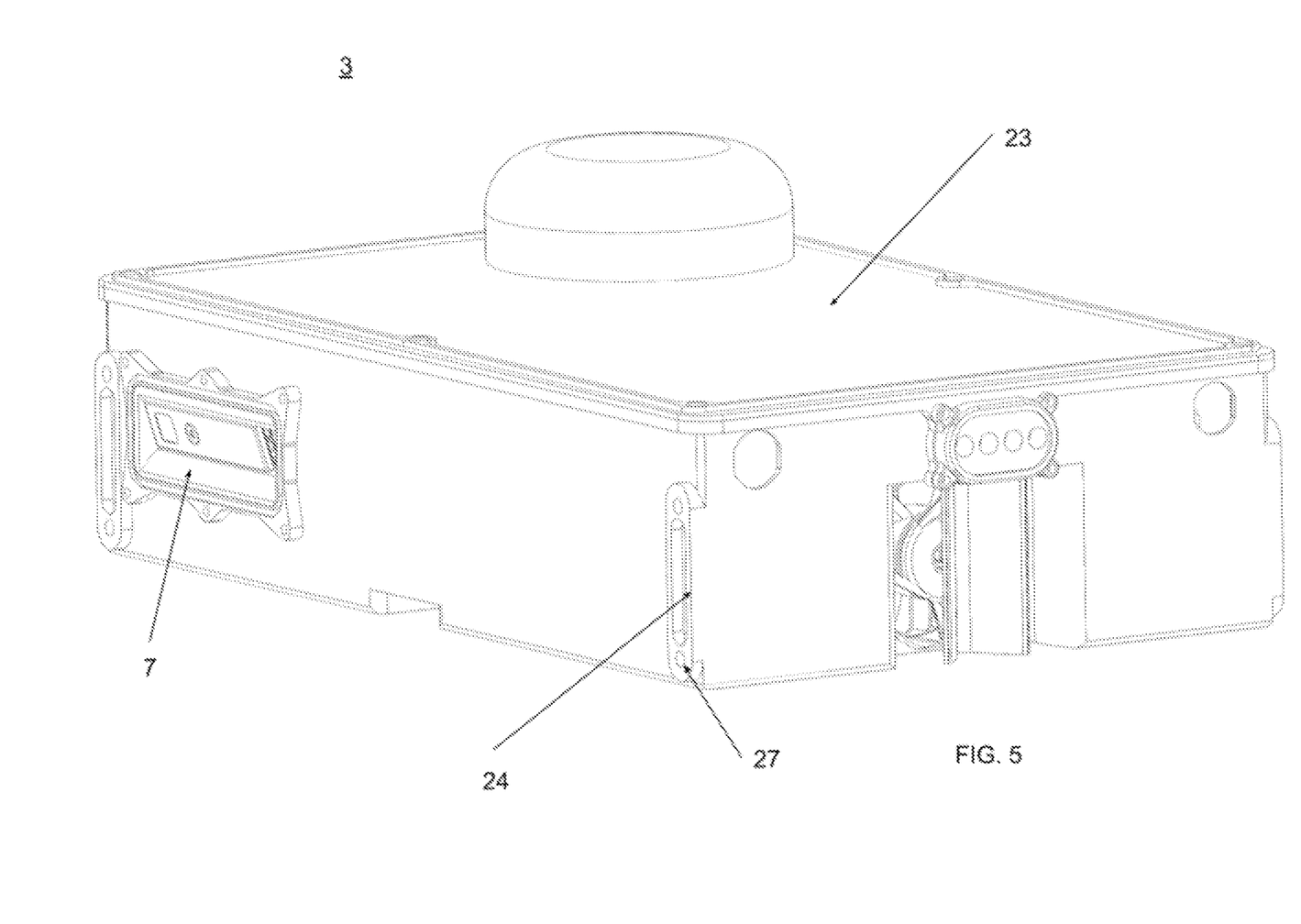
FIG. 5 is a perspective view of Computing Box according to an aspect of the present disclosure.

FIG. 5 is a perspective view of Computing Box 3. Computing Box 3 may contain a Protective Housing 23 wherein electrical, computing, and control components are stored. Protective Housing 23 may be constructed out of materials specifically designed for the environment in which Robotic System 500 is to be used. For example, if such an environment was near or under water, then Protective Housing 23 may be made constructed to be watertight out of a material that strongly resists corrosion, and that has proper buoyancy characteristics. In one non-limiting aspect, Sensor Enclosure 7 may be affixed to or integrated with Protective Housing 23 as shown in FIG. 5.

Computing Box 3 may include a Computing Box Guide 24 which may easily guide a user to install Computing Box 3 within Frame 1. In one non-limiting aspect, Computing Box Guide 24 may be a unique geometric shape or frame that permits installation only when Computing Box 3 is oriented in a specific and correct way, relative to Frame 1. Computing Box 3 may include a disengageable Computing Box Fastener 27 that may provide additional structural support to Computing Box 3. Computing Box Fastener 27 may be a clamp, adhesive, threaded fasteners, interference fit, magnetic, hook and loop, push pin or "push and click" connectors, or similar disengageable support technologies. In one non-limiting aspect, Computing Box Fastener 27 may be a hole that mates with Bracket Fastener 26 located on Side Bracket 8.

Figure 6:
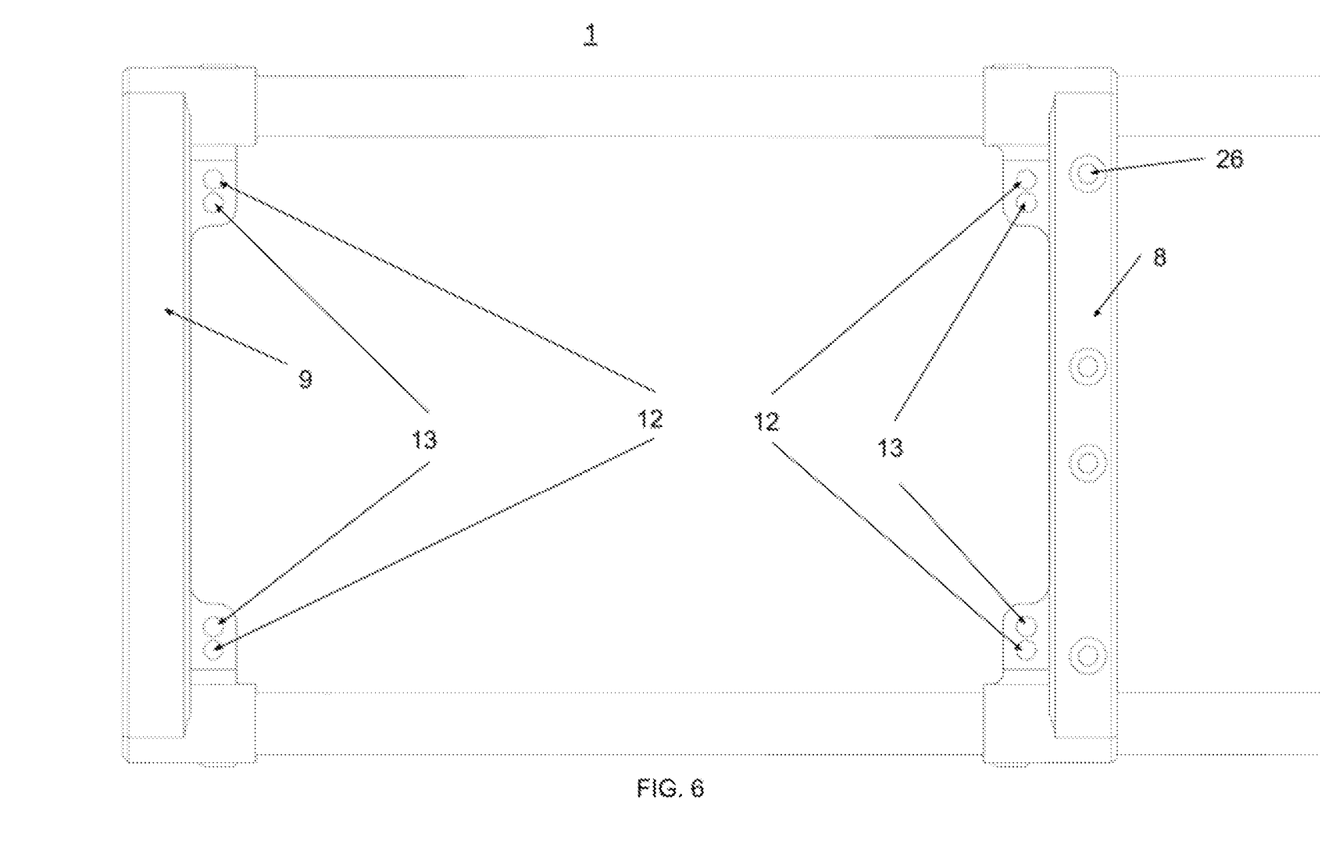
FIG. 6 is a side view of a portion of the Frame according to an aspect of the present disclosure.

FIG. 6 is a side view of an inside end of Frame 1 according to one aspect of the present disclosure, showing Side Brackets 8 and Corner Brackets 9 inclusive of Alignment Guide 12 and Alignment Fastener 13. Side Brackets 8 and Corner Brackets 9 may also include Alignment Guide 12 and Alignment Fastener 13 towards the top of Frame 1. This may enable Frame 1 to couple with other motive subassemblies, other than Leg Subassembly 2, which may provide controlled motion in other ways. Interface Bracket 16 may exist on different types of motive subassemblies thereby enabling controlled connection and interfacing with Frame 1 via Alignment Guide 12 and Alignment Fastener 13. Other subassemblies may utilize wheels, treads, spinning rotors, gyroscopes, fans, turbines, thrust components, or other mechanisms to achieve controlled movement. These assemblies may attach to Frame 1 via Alignment Guide 12 and Alignment Fastener 13 located at either the top or bottom of Side Brackets 8 and Corner Brackets 9.

Alignment Guide 12 and Alignment Fastener 13 may optionally transmit electrical signals and power from Frame 1 to Leg Subassembly 2 through their connection with Interface Bracket 16 located on Pod 15. In one non limiting aspect, Interface Bracket 16 may include a peg that mates with Alignment Fastener 13 wherein both components are electrically conductive. Frame 1 may route power and electrical signals from Energy Box 4 and Computing Box 3 to Alignment Fastener 13, which may then transmit power and electrical signals to Interface Bracket 16 through the peg and to Leg Subassembly 2. The interface between Interface Bracket 16, Side Bracket 8, and Corner Bracket 9 may be interchangeable, wherein the electrical connection may be established through Alignment Guide 12, rather than Alignment Fastener 13, and such connection may be achieved through methods other than a peg and hole. For example, there may be an interface bus wherein a connection is established through a wire connection, or electrical power and signals may be transmitted to Leg Subassembly 2 through wireless remote transmission technology.

Still referencing FIG. 6, Side Brackets 8 may include a Bracket Fastener 26 that may mate with Energy Box Fastener 21 and Computing Box Fastener 27, thereby providing structural support through ample connection mechanisms including, but are not limited to, threaded fasteners, clips, adhesives, hook and loops, magnets, "push and click" connectors, interference fits, and others. In another non-limiting aspect, Corner Brackets 9 may also include Bracket Fastener 26 thereby allowing a similar coupling thereto, though this is not pictured in FIG. 6.

Figure 7:
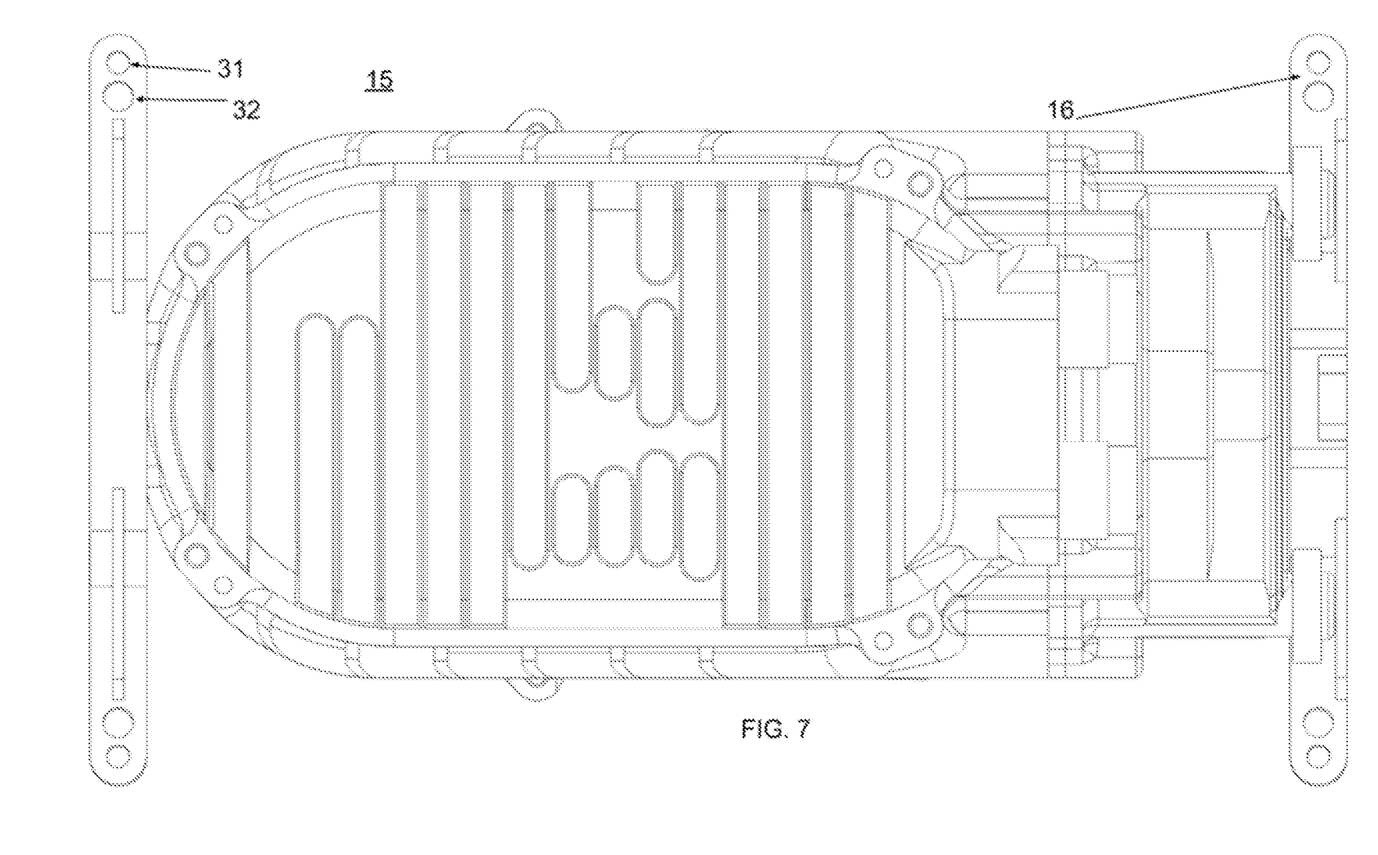
FIG. 7 is a side view of the Pod of the Leg Subassembly according to an aspect of the present disclosure.

FIG. 7 is a side view of Pod 15 within Leg Subassembly 2 according to an aspect of the present disclosure. Pod 15 may include Interface Bracket 16 which connects Leg Subassembly 2 to Frame 1. In one non-limiting aspect, Interface Bracket 16 may include a Pod Fastener 31 and Pod Guide 32 that mates with counterparts on Frame 1, for example, Alignment Guide 12 and Alignment Fastener 13, respectively.

Pod Guide 32 may be a geometric feature including, but not limited to, a hole, prong, or peg capable of providing alignment, and a load bearing connection when attaching to Leg Subassembly 2 to Frame 1 through the use of pins, splines, edge contacts, or similar mechanisms. Pod Fastener 31 may be a retention mechanism including, but not limited to, a hole, prong, or peg to correctly align Leg Subassembly 2 with Frame 1 through the use of connectors including but not limited to threaded fasteners, clips, adhesives, hook and loops, interference fits, electromagnetic, or other fasteners. In one non-limiting aspect, Pod Guide 32 may be a prong or peg, and Pod Fastener 31 may be a hole. Pod Guide 32 and Pod Fastener 31 may be able to transmit electrical signals and power from Frame 1 to Pod 15 through connection with Alignment Guide 12 or Alignment Faster 13.

Figure 8:
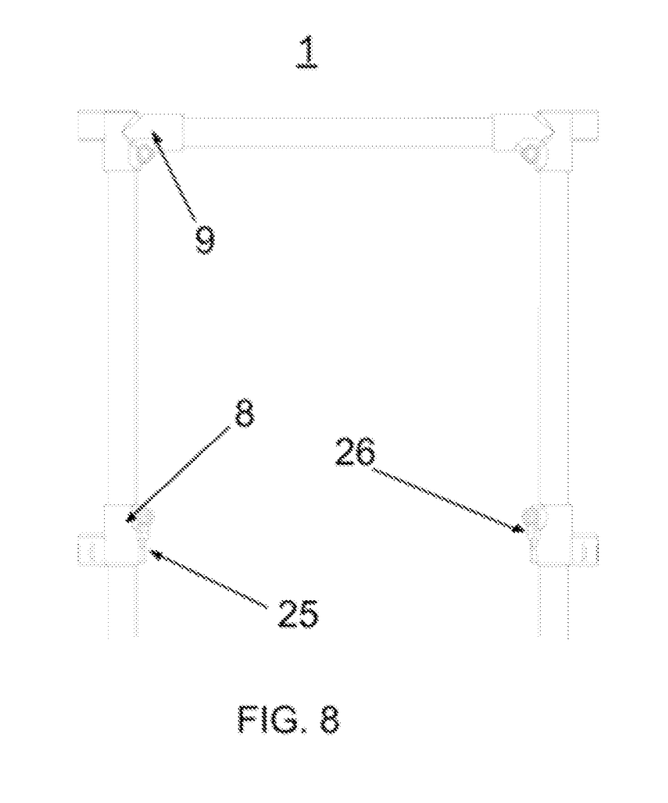
FIG. 8 is a top view of a portion of the Frame according to an aspect of the present disclosure.

FIG. 8 is a top-down view of Frame 1 according to an aspect of the present disclosure. Side Brackets 8 may have Ridge 25 that may interact with Energy Box Guide 20 or Computing Box Guide 24, thereby preventing an incorrect installation into Frame 1. Ridge 25 may be a unique geometric shape or frame that permits installation only when Energy Box 4 or Computing Box 3 is oriented in a specific and correct way, relative to Frame 1. Side Brackets 8 may include a Bracket Fastener 26 that may, once correct installation is permitted by Ridge 25, mate with Energy Box Fastener 21 and Computing Box Fastener 27, thereby providing structural support through ample connection mechanisms including, but are not limited to, threaded fasteners, clips, adhesives, hook and loops, magnets, "push and click" connectors, interference fits, and others. In another non-limiting aspect, Corner Brackets 9 may also include Ridge 25 and Bracket Fastener 26 thereby allowing a similar coupling thereto, although this particular configuration is not shown in FIG. 8.

Figure 9:
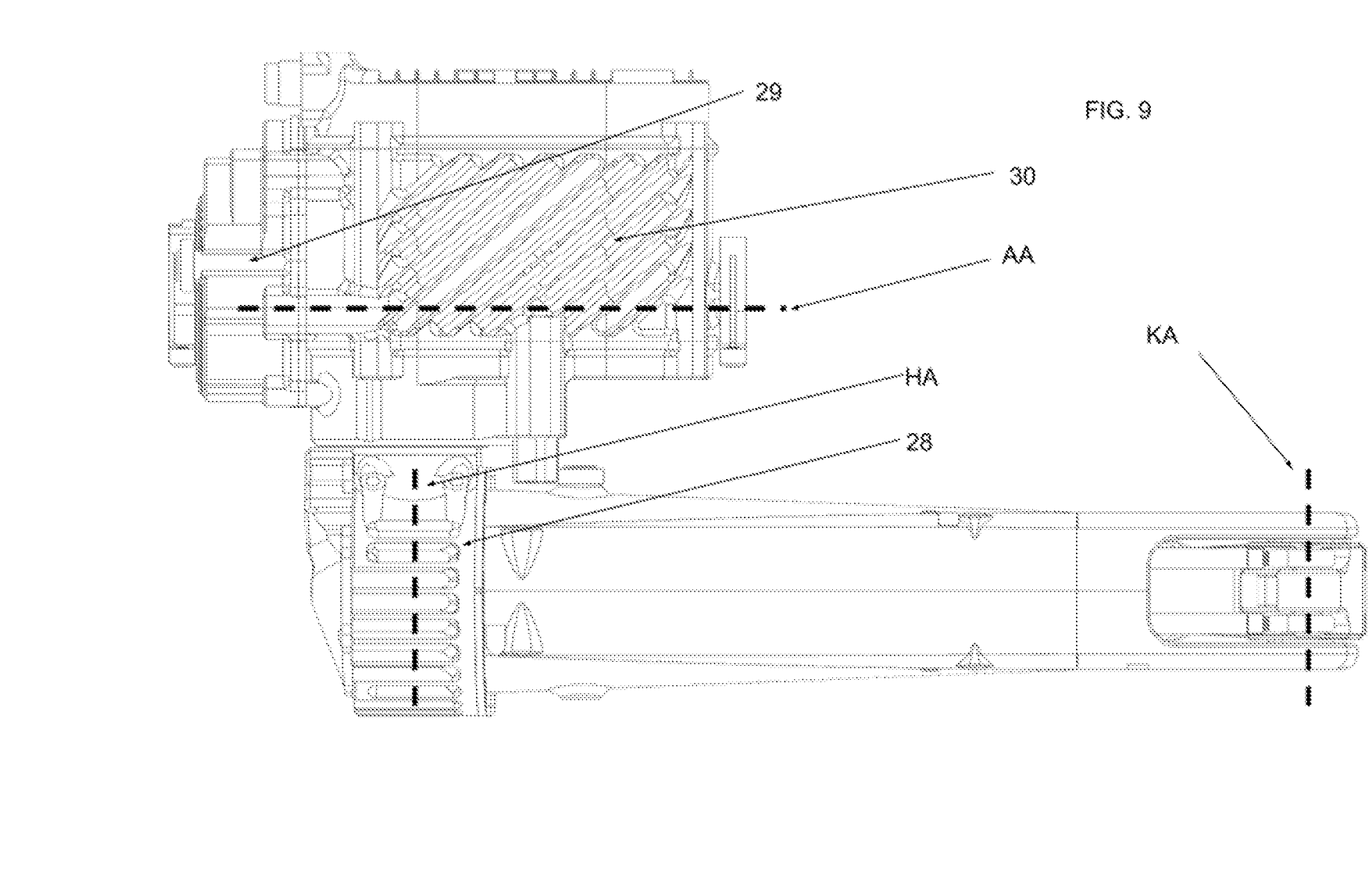
FIG. 9 is a top view of the Pod within the Leg Subassembly according to an aspect of the present disclosure.

FIG. 9 is a top view of Pod 15 and Leg Subassembly 2 according to an aspect of the present disclosure. Pod 15 may include an Abduction Motor 29 that may include a motor and requisite gear train, electrical and control components such as encoders and motor controllers, and kinetic transmission systems designed to actuate rotation of Leg Components 17 about the abduction axis AA. Pod 15 may also include a Hip Motor 30 which may include a motor and requisite gear train, electrical and control components such as encoders and motor controllers, and kinetic transmission systems designed to actuate rotation of Leg Components 17 about the hip axis HA. Knee Motor 28 may include a motor and requisite gear train, electrical and control components such as encoders and motor controllers, and kinetic transmission systems designed to actuate rotation of Leg Components 17 about the knee axis KA. In one non-limiting example, axes HA and KA may be parallel, and axis AA may be perpendicular to axes HA and KA. In one non-limiting example, Knee Motor 28 may be located close to axis HA to minimize inertia.

In one non-limiting example, Pod 15 may be mechanically coupled to Frame 1. Abduction Motor 29 may be mechanically coupled to Frame 1. The mechanical output of Abduction Motor 29 may be transmitted to Hip Motor 30. The mechanical output of Hip Motor 30 may be transmitted to Knee Motor 28.

Pod 15 may include a motor controller (not shown) that communicates with Computing Box 3 and with one or more of Knee Motor 28, Abduction Motor 29, and Hip Motor 30. As a result of the operation of the motor controller at Pod 15, there may be a reduced number of wires from Computing Box 3 to Pod 15, such as, in one non-limiting example, two power wires plus four signal wires. In another aspect, Pod 15 and motors may receive additional or alternative power from Energy Box 4.

Figure 10:
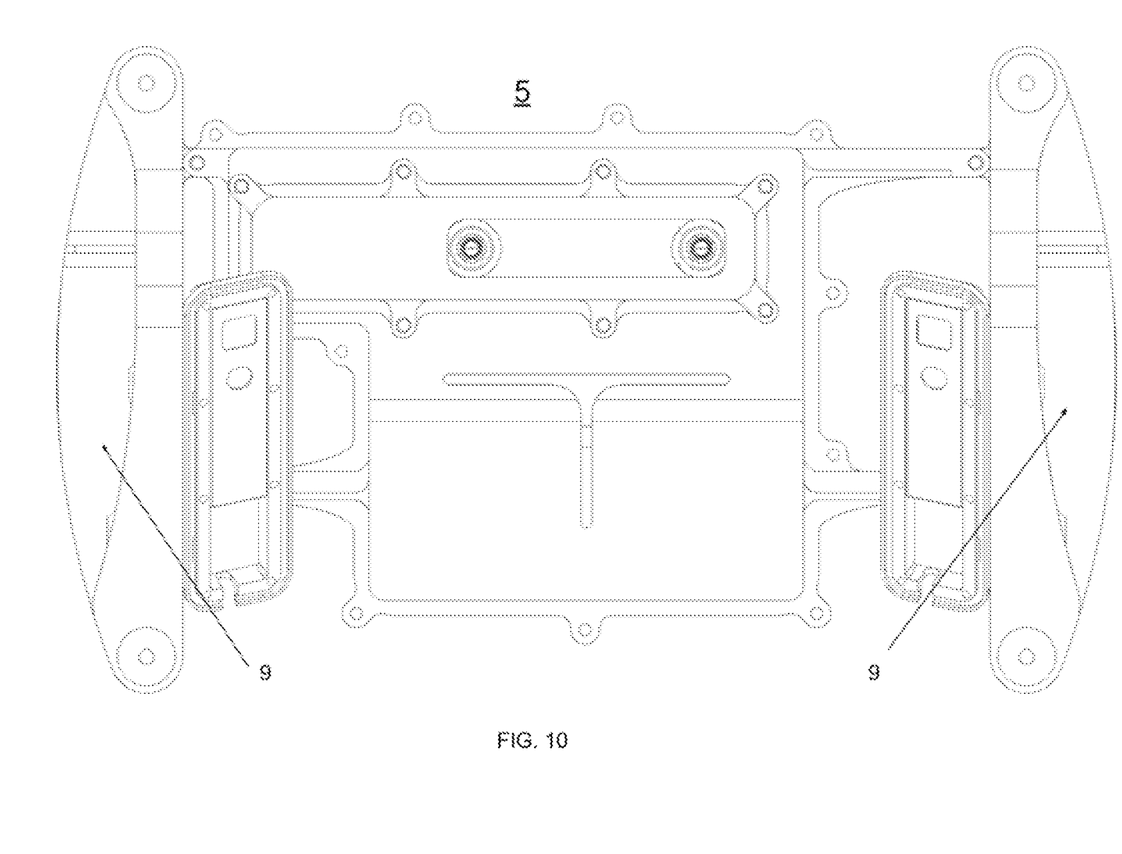
FIG. 10 is a front view of the Sensor Panel according to an aspect of the present disclosure.

FIG. 10 is a front view of Sensor Panel 5 according to an aspect of the present disclosure. Sensor Panel 5 may be a panel that supports or provides connections for electrical, sensory and user interface components that may be attached to the front, back, or side of Frame 1. Sensor Panel 5 may support various components and connectors, including, but not limited to, sensors, screens, buttons, interface ports and buses, switches, electrical components capable of transmitting or receiving power to or from an outside source including in the presence of an electromagnetic field. In one non-limiting aspect, Sensor Panel 5 may have an electrical interface wherein Robotic System 500 may be electrically charged through connection to an outside power source. In one non-limiting aspect, Sensor Panel 5 may be affixed to Corner Brackets 9 through various connective techniques including but not limited to, welding, clamping, adhesive, threaded fasteners, interference fit, magnetic, hook and loop, or similar joining technologies.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The invention claimed is:

1. A legged robot, comprising:
a frame comprising a front, back, top, bottom, and sides;
four legs, each leg removably mechanically coupled to the frame, each leg mechanically attachable and detachable to the frame by a user via a mechanical fastening mechanism;
each leg comprising a sealed motor enclosure at a proximal end of the leg, the sealed motor enclosure at least partially enclosing an abduction motor having an abduction output mechanically coupled to the frame, and the sealed motor enclosure at least partially enclosing a hip motor mechanically coupled to the abduction motor;
each leg further comprising a knee motor external to the sealed motor enclosure and mechanically coupled to a hip motor output of the hip motor;
a computer module in mechanical communication with the frame and in electrical communication with the legs; and
a power module in mechanical communication with the frame and in electrical communication with the legs and the computer module.

2. The legged robot of claim 1, wherein the sealed motor enclosure encloses a motor controller in electrical communication with the computer module.

3. The legged robot of claim 2, wherein each of the abduction motor, hip motor, and knee motor has an associated encoder, and each associated encoder is in electronic communication with the motor controller.

4. The legged robot of claim 1, wherein the abduction motor actuates movement of the sealed motor enclosure.

5. The legged robot of claim 1, wherein the sealed motor enclosure is mechanically coupled to the frame via a mechanical fastener.

6. The legged robot of claim 5, where the mechanical fastener facilitates communication of one of electrical power and electrical signal to the motor enclosure.

7. The legged robot of claim 1, wherein the knee motor is mechanically coupled to an upper leg member, and the upper leg member is mechanically coupled to a lower leg member by a joint.

8. The legged robot of claim 1, further comprising a sensor head mechanically coupled to the frame and in electrical communication with one or more of the computer module and the power module.

9. The legged robot of claim 1, wherein the computer module and power module are at least partially located within an interior space within the frame.

* * * * *